United States Patent
Magcale

(10) Patent No.: US 11,775,826 B2
(45) Date of Patent: *Oct. 3, 2023

(54) ARTIFICIAL INTELLIGENCE WITH CYBER SECURITY

(71) Applicant: Nautilus TRUE, LLC, San Ramon, CA (US)

(72) Inventor: Arnold Castillo Magcale, San Ramon, CA (US)

(73) Assignee: Nautilus TRUE, LLC, San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/542,491

(22) Filed: Dec. 5, 2021

(65) Prior Publication Data

US 2022/0188634 A1     Jun. 16, 2022

Related U.S. Application Data

(63) Continuation of application No. 16/185,908, filed on Nov. 9, 2018, now Pat. No. 11,200,491, which is a
(Continued)

(51) Int. Cl.
*G06N 3/08* (2023.01)
*H04L 9/40* (2022.01)

(52) U.S. Cl.
CPC ........... *G06N 3/08* (2013.01); *H04L 63/1408* (2013.01); *H04L 63/1441* (2013.01)

(58) Field of Classification Search
CPC .... G06N 3/08; H04L 63/1408; H04L 63/1441
See application file for complete search history.

(56) References Cited

U.S. PATENT DOCUMENTS 6,134,511 A     10/2000   Subbarao
6,212,895 B1    4/2001    Richardson
(Continued)

FOREIGN PATENT DOCUMENTS

JP     2010269641 A    12/2010
WO     WO-0048288 A1    8/2000
(Continued)

OTHER PUBLICATIONS

Cole. Data Center Infrastructure Management (DCM). Data Center Knowledge. (Website.) Mar. 2013. Retrieved at URL: http://www.nolimitssoftware.com/wp-content/uploads/2013/03/DCIM-Guide.pdf. 17 pages.

(Continued)

*Primary Examiner* — Ayoub Alata
(74) *Attorney, Agent, or Firm* — Wilson Sonsini Goodrich & Rosati

(57) ABSTRACT

A cyber security system that uses artificial intelligence, such neural networks, to monitor the security of a computer network and take automated remedial action based on the monitoring. The security system autonomically learns behavior profiles, attack profiles and circumvention techniques used to target the network. The remedial action taken by the system includes isolating any misuse that has been identified, surveilling the misuse in the isolated environment, analyzing its behavior profile and reconfiguring the network to enhance security.

16 Claims, 3 Drawing Sheets

Related U.S. Application Data continuation-in-part of application No. 14/959,608, filed on Dec. 4, 2015, now Pat. No. 10,158,653.

(56) References Cited

U.S. PATENT DOCUMENTS

| | | | |
|---|---|---|---|
| 6,692,349 B1 | 2/2004 | Brinkerhoff et al. | |
| 6,990,395 B2 | 1/2006 | Ransom et al. | |
| 7,058,710 B2 | 6/2006 | McCall et al. | |
| 7,278,273 B1 | 10/2007 | Whitted et al. | |
| 7,525,207 B2 | 4/2009 | Clidaras et al. | |
| 7,738,251 B2 | 6/2010 | Clidaras et al. | |
| 8,359,191 B2 | 1/2013 | Chen et al. | |
| 8,853,872 B2 | 10/2014 | Clidaras et al. | |
| 9,471,946 B1 * | 10/2016 | Keil | F24F 11/32 |
| 9,618,222 B1 | 4/2017 | Hussain et al. | |
| 10,158,653 B1 | 12/2018 | Magcale et al. | |
| 10,222,768 B2 | 3/2019 | Lancaster | |
| 11,200,491 B2 | 12/2021 | Magcale | |
| 2002/0010709 A1 | 1/2002 | Culbert et al. | |
| 2006/0117767 A1 | 6/2006 | Mowris | |
| 2006/0259201 A1 | 11/2006 | Brown | |
| 2007/0213000 A1 | 9/2007 | Day | |
| 2007/0281639 A1 | 12/2007 | Clidaras et al. | |
| 2008/0033599 A1 | 2/2008 | Aminpour et al. | |
| 2008/0209234 A1 | 8/2008 | Clidaras et al. | |
| 2009/0037268 A1 | 2/2009 | Zaid et al. | |
| 2009/0083126 A1 | 3/2009 | Koren et al. | |
| 2009/0084297 A1 | 4/2009 | Choi et al. | |
| 2009/0126910 A1 | 5/2009 | Campbell et al. | |
| 2009/0207567 A1 | 8/2009 | Campbell et al. | |
| 2009/0295167 A1 | 12/2009 | Clidaras et al. | |
| 2009/0299824 A1 | 12/2009 | Barnes, Jr. | |
| 2010/0030552 A1 | 2/2010 | Chen et al. | |
| 2010/0163633 A1 | 7/2010 | Barrett et al. | |
| 2010/0298997 A1 | 11/2010 | Ohba et al. | |
| 2011/0060470 A1 | 3/2011 | Campbell et al. | |
| 2011/0072293 A1 | 3/2011 | Mazzaferri et al. | |
| 2011/0207391 A1 | 8/2011 | Hamburgen et al. | |
| 2012/0042263 A1 | 2/2012 | Rapaport et al. | |
| 2012/0136998 A1 | 5/2012 | Hough et al. | |
| 2012/0166433 A1 | 6/2012 | Tseng | |
| 2012/0166616 A1 | 6/2012 | Meehan et al. | |
| 2012/0203380 A1 | 8/2012 | Scelzi et al. | |
| 2013/0204439 A1 | 8/2013 | Scelzi | |
| 2013/0238795 A1 | 9/2013 | Geffin et al. | |
| 2014/0165060 A1 | 6/2014 | Muller et al. | |
| 2014/0259618 A1 | 9/2014 | Damus et al. | |
| 2015/0133043 A1 | 5/2015 | Patel et al. | |
| 2016/0044054 A1 | 2/2016 | Stiansen et al. | |
| 2016/0127875 A1 | 5/2016 | Zampini, II | |
| 2016/0330285 A1 | 11/2016 | Brophy et al. | |
| 2018/0119973 A1 | 5/2018 | Rothman et al. | |

FOREIGN PATENT DOCUMENTS

| | | |
|---|---|---|
| WO | WO-2009055368 A2 | 4/2009 |
| WO | WO-2010129341 A1 | 11/2010 |
| WO | WO-2012047746 A2 | 4/2012 |
| WO | WO-2013113138 A1 | 8/2013 |

OTHER PUBLICATIONS

U.S. Appl. No. 14/959,608 Notice of Allowance dated Aug. 9, 2018.
U.S. Appl. No. 14/959,608 Office Action dated Apr. 12, 2017.
U.S. Appl. No. 14/959,608 Office Action dated Nov. 15, 2017.
U.S. Appl. No. 16/185,908 Notice of Allowance dated Aug. 12, 2021.
U.S. Appl. No. 16/185,908 Office Action dated Apr. 2, 2021.
U.S. Appl. No. 16/185,908 Office Action dated Oct. 21, 2020.

* cited by examiner

ARTIFICIAL INTELLIGENCE WITH CYBER SECURITY

CROSS REFERENCE TO RELATED APPLICATIONS

This application is a continuation of application Ser. No. 16/185,908 filed Nov. 9, 2018, now U.S. Pat. No. 11,200,491, and entitled "ARTIFICIAL INTELLIGENCE WITH CYBER SECURITY" which in turn is a continuation-in-part of application Ser. No. 14/959,608 filed 4 Dec. 2015, now U.S. Pat. No. 10,158,653, having a priority date of Dec. 4, 2015 and entitled "Artificial Intelligence with Cyber Security" each of which is hereby incorporated by reference in its entirety.

BACKGROUND

This invention relates to cyber-security monitoring and more particularly automated and learned responses to such monitoring. The rapid growth of data usage also brings about the rapid growth of vulnerability with regard to the physical and virtual security of the data centers required to store and process this data. Conventional data center security systems lack the agility to detect and respond to these threats in a truly proactive manner. The system and method described herein for securing data within a data center or elsewhere includes holistically collecting data, assessing/analyzing risk and automatically providing a remedial response to that risk based on learned behaviors, attack profiles and circumvention techniques.

SUMMARY

The following presents a simplified summary relating to one or more aspects and/or embodiments disclosed herein. As such, the following summary should not be considered an extensive overview relating to all contemplated aspects and/or embodiments.

Embodiments disclosed include a method for holistically collecting security information data over the network, from a plurality of appliances and application layers. In the disclosed method, the collecting also includes assessing and analyzing a risk component of the collected security information. The collecting also includes providing an appropriate automated response to the assessed and analyzed security risk component via a remediation implementation layer.

Other embodiments of this aspect include corresponding computer systems, apparatus, and computer programs recorded on one or more computer storage devices, each configured to perform the actions of the methods.

An embodiment includes, in a computer automated system capable of communicating over a network, a method for detecting security threats over the network, and for taking remedial action based on the detected threats, the method including: holistically collecting security information data over the network, from a plurality of appliances and applications. Based on the collected security information data, the computer system is configured for assessing a risk level and identifying based on pre-determined criteria, zero or more security risks from the collected data. The system is further configured for analyzing and identifying a risk profile of an appliance or application based on the assessed risk level and the zero or more identified security risks, and for automatically isolating any misuse that has been identified with the identified security risk profiles. Further, this triggers automatically implementing surveillance of the misuse in the isolated environment, and analyzing the security and behavior profile of data collected from the surveillance of the isolated misuse. In the disclosed method, the systems are configured for autonomically learning the behavior profile of the identified appliance or application, and for assessing the security risks based on the learned behavior profile; and autonomically learning of attack profiles and circumvention techniques used to target the network, appliances and applications. Other embodiments of this aspect include corresponding computer systems, apparatus, and computer programs recorded on one or more computer storage devices, each configured to perform the actions of the methods.

Embodiments disclosed include a computer automated system capable of communicating over a network, configured to detect security threats over the network, and to take remedial action on detected threats, where the system is caused to holistically collect security information data over the network, from a plurality of appliances and application layers. The system is further caused to assess and analyze a risk component of the collected security information. And in a remediation implementation layer, the system is configured to provide appropriate automated responses to the assessed and analyzed security risk component. Other embodiments of this aspect include corresponding computer systems, apparatus, and computer programs recorded on one or more computer storage devices, each configured to perform the actions of the methods.

Embodiments disclosed include a computer automated system capable of communicating over a network, configured to detect security threats over the network, and to take remedial action based on the detected threats, wherein the system is caused to holistically collect security information data over the network, from a plurality of appliances and applications. Based on the collected security information data, the system is further caused to assess a risk level and identify based on pre-determined criteria, zero or more security risks from the collected data. The assessment triggers an analysis and identification of a risk profile of an appliance or application based on the assessed risk level and the zero or more identified security risks. Identified risks trigger an automatic isolation of any misuse that has been identified with the identified security risk profiles and automatic implementation of surveillance in the isolated environment. Data collected from the surveillance of the isolated misuse is analyzed and the result of the analysis triggers autonomic learning of the behavior profile of the identified appliance or application. This triggers an assessment of the security risks based on the learned behavior profile. Preferably the system is configured to autonomically learn of attack profiles and circumvention techniques used to target the network, appliances and applications. Other embodiments of this aspect include corresponding computer systems, apparatus, and computer programs recorded on one or more computer storage devices, each configured to perform the actions of the methods.

DETAILED DESCRIPTION

Figure 1:
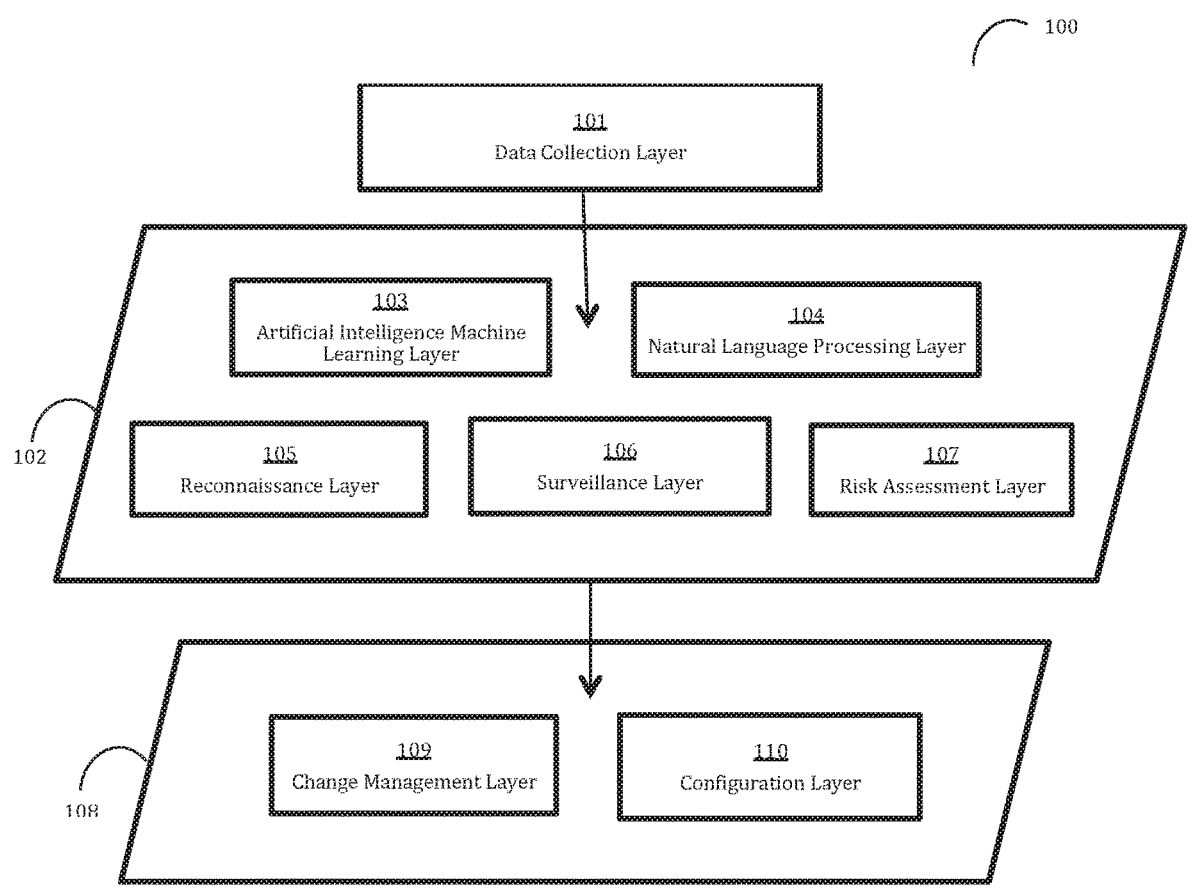
FIG. 1 depicts a system for detecting security threats over a network and taking remedial action based on those detected security threats.
Figure 2:
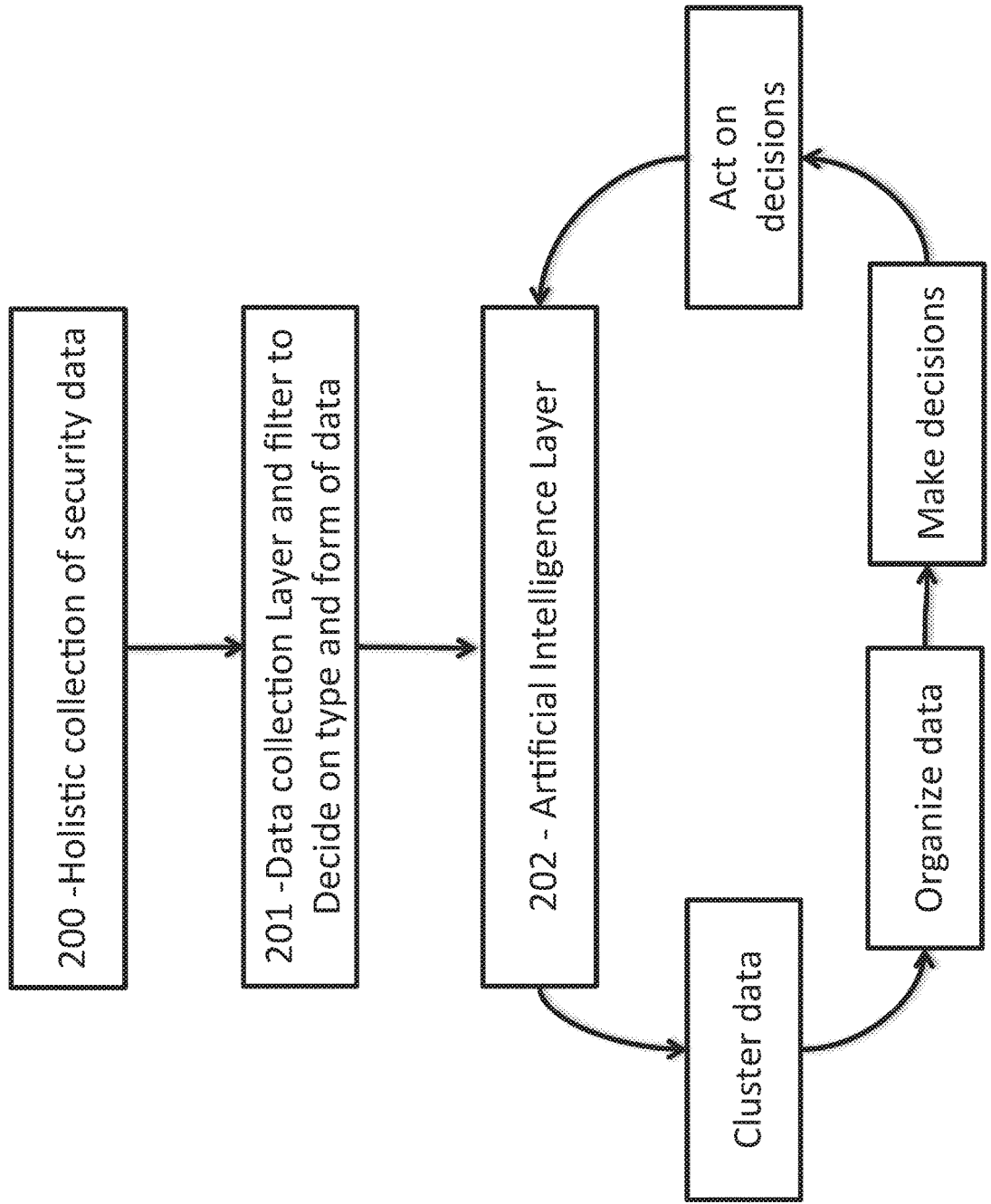
FIG. 2 depicts the flow of data through a holistic data collection devise, which takes all of the data from every aspect of the security system, performs a rudimentary analysis of the system through a clustering program 200. Then, the data is collected and organized into different types and forms of the data based on how it is clustered into various forms 201. This could be based on levels of importance, type of form of data. The next level is the artificial intelligence level, which refers to a computation engine, which uses analytics tools to organize data, make decisions about threats and non-threats, and ultimately acts on the data 202.
Figure 3:
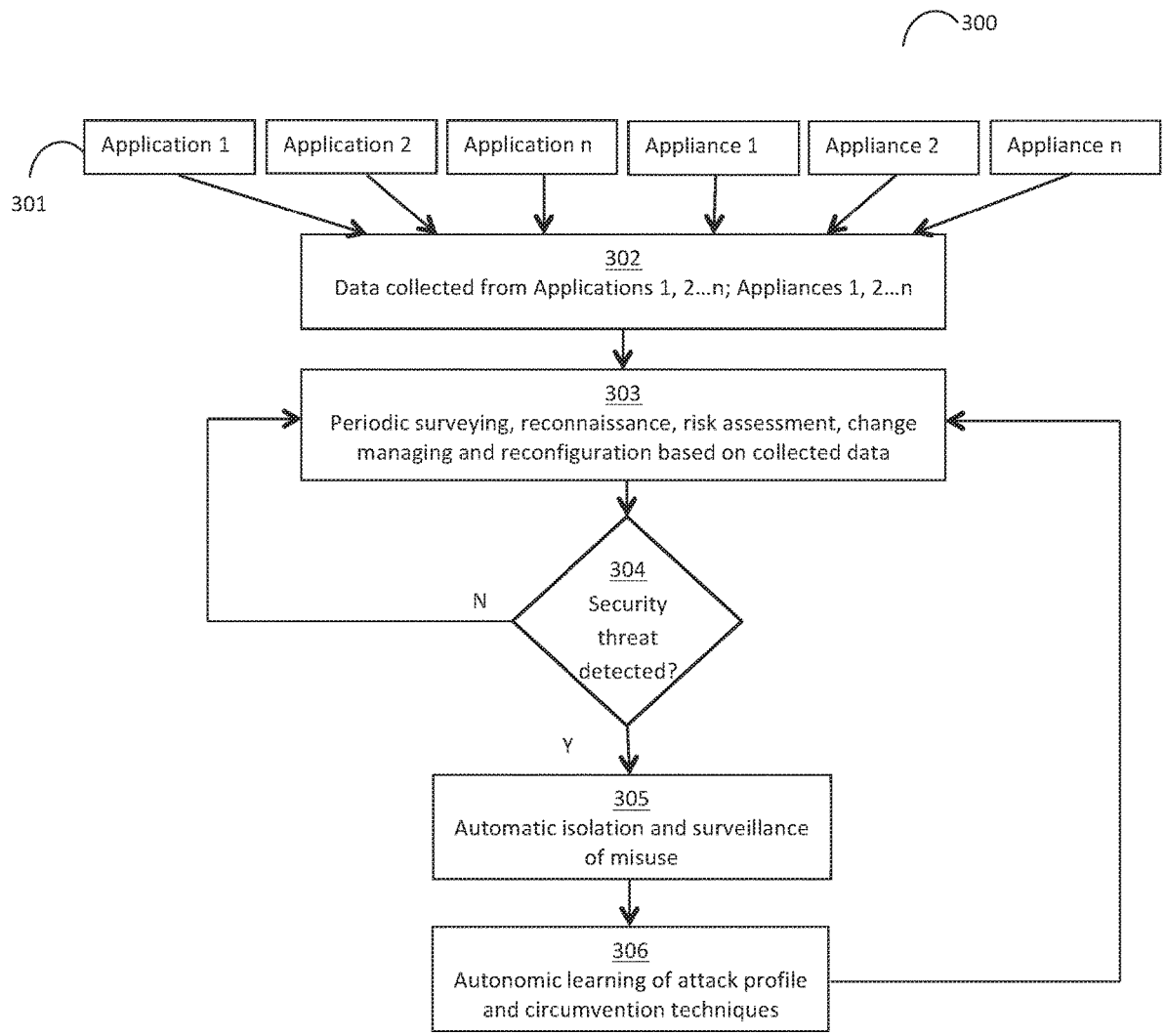
FIG. 3 depicts the flow of data through the system 300. Data is collected from a plurality of appliances and applications 301 in a data collection layer 302. The data is then assessed and analyzed in an assessment and analysis layer 303. The assessment and analysis comprises cognitive cyber security analytics in an artificial neural network to autonomically learn threat patterns, vulnerabilities, anomalous behavior, malicious attacks or misuse of the network or application asset. The assessment and analysis further comprises natural language processing, periodic surveying, periodic reconnaissance, periodic risk assessment, periodic change managing and periodic reconfiguration. If the security risk profile detects a security risk 304, the misuse is automatically isolated and then surveilled in the isolated environment 305. In addition, based on the surveillance and behavior profile data, the system autonomously learns the attack profiles and circumvention techniques used to target the network, appliances and applications 306. Autonomic learning of the behavior profile of the identified appliance or application enables future preemptive corrective action.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Embodiments disclosed include a computer implemented method for detecting security threats over a network, and for performing cyber-security defense by taking remedial action on detected threats. The method comprises holistically collecting security information data over the network, from a plurality of appliances and application layers. The method further includes assessing and analyzing a risk component of the collected security information, and accordingly providing an appropriate automated response to the assessed and analyzed security risk component via a remediation implementation layer.

According to an embodiment, the computer implemented method further comprises at least one of evaluating, simulating and recognizing a usage pattern that puts a computer at risk. Additionally, the assessing and analyzing further comprises cognitive cyber-security analytics in an artificial neural network implemented method that comprises autonomic machine learning for recognition of threat patterns, vulnerabilities, anomalous behavior, malicious attack or misuse of network or application assets.

According to an embodiment of the computer implemented method, a data collection layer is configured for data collection; and an artificial intelligence machine learning layer is configured to assess and analyze the collected data, and based on the collected data, assessment and analysis, implement an artificial intelligence machine learning. According to a preferred embodiment, the assessment and analysis further comprises natural language processing in a natural language processing layer, a periodic surveying in a surveillance layer, a periodic reconnaissance in a reconnaissance layer, a periodic risk assessment in a risk assessment layer, a periodic change managing in a change management layer, and a periodic reconfiguration in a configuration layer.

Embodiments disclosed include computer implemented methods for detection of security threats over a network, and methods for taking remedial action based on the detected threats. The method comprises holistically collecting security information data over the network, from a plurality of appliances and applications. Based on the collected security information data, the method comprises assessing a risk level and identifying based on pre-determined criteria, zero or more security risks from the collected data. Further, the method includes analyzing and identifying a risk profile of an appliance or application based on the assessed risk level and the zero or more identified security risks. According to a preferred embodiment, the method comprises automatically isolating any misuse that has been identified with the identified security risk profiles and automatically implementing surveillance of the misuse in the isolated environment, and analyzing the security and behavior profile data collected from the surveillance of the isolated misuse. Preferably, in the method, autonomously learning the behavior profile of the identified appliance or application enables future preemptive corrective action. Additionally the method comprises assessing the security risks based on the learned behavior profile, and autonomously learning of attack profiles and circumvention techniques used to target the network, appliances and applications.

According to an embodiment, the method comprises at least one of evaluating, simulating and recognizing a usage pattern that puts a computer at risk. The assessing and analyzing further comprises cognitive cyber-security analytics in an artificial neural network implemented method that comprises autonomic machine learning for recognition of threat patterns, vulnerabilities, anomalous behavior, malicious attack or misuse of network or application assets.

According to an embodiment, a data collection layer is configured for data collection. Further, an artificial intelligence machine learning layer is configured for artificial intelligence based machine learning, based on an analysis and assessment of the collected data. Preferably, the assessment and analysis further comprises natural language processing in a natural language processing layer, a periodic surveying in a surveillance layer, a periodic reconnaissance in a reconnaissance layer, a periodic risk assessment in a risk assessment layer, a periodic change managing in a change management layer, and a periodic reconfiguration in a configuration layer.

Embodiments disclosed include a computer automated system accessible over a network, configured to detect security threats over the network, and to take remedial action on detected threats. The system comprises a processor; a non-transitory storage medium coupled to the processor, and encoded instructions stored in the non-transitory storage medium. The encoded instructions when executed by the processor, cause the computer system to holistically collect security information data over the network, from a plurality of appliances and application layers. Further the system is caused to assess and analyze a risk component of the collected security information, and in a remediation implementation layer, provide appropriate automated responses to the assessed and analyzed security risk component.

According to an embodiment, the system is caused to evaluate, simulate or/and recognize a usage pattern that puts a computer at risk. Further, the system comprises in the assessing and analyzing the risk component, a cognitive cyber-security analytics in an artificial neural network implementation that comprises autonomic machine learning for recognition of threat patterns, vulnerabilities, anomalous behavior, malicious attack or misuse of network or application assets.

According to an embodiment, the system comprises a data collection layer, configured for holistic data collection. Preferably, the system further comprises an artificial intelligence machine learning layer, configured to, based on the assessment and analysis of the collected data, is configured to learn, based on the collected data, learn to pre-empt remedial action. The assessment and analysis further comprises natural language processing in a natural language processing layer, a periodic surveying in a surveillance layer, a periodic reconnaissance in a reconnaissance layer, a periodic risk assessment in a risk assessment layer, a periodic change managing in a change management layer, and a periodic reconfiguration in a configuration layer.

Embodiments disclosed include a computer automated system capable of communicating over a network, configured to detect security threats over the network, and to take remedial action based on the detected threats. The system is caused or configured to holistically collect security information data over the network, from a plurality of appliances and applications. The system is further caused to, based on the collected security information data, assess a risk level and identify based on pre-determined criteria, zero or more security risks from the collected data. Additionally, the system is configured to analyze and identify a risk profile of an appliance or application based on the assessed risk level and the zero or more identified security risks. According to a preferred embodiment, the system is configured to automatically isolate any misuse that has been identified with the identified security risk profiles and automatically implement surveillance of the misuse in the isolated environment. Further, the behavior and security profile of data collected from the surveillance of the isolated misuse is analyzed. Preferred embodiments include configurations that enable autonomically learning the behavior profile of the identified appliance or application, and accordingly assessing the security risks based on the learned behavior profile. In some embodiments the system is configured to autonomically learn of attack profiles, and implement circumvention techniques used to target the network, appliances and applications.

The computer system is further caused to evaluate, simulate or/and recognize a usage pattern that puts a computer at risk. According to an embodiment the system is further caused to in the assessing and analyzing the risk component, analyze via a cognitive cyber-security analytics in an artificial neural network implementation that comprises autonomic machine learning for recognition of threat patterns, vulnerabilities, anomalous behavior, malicious attacks or misuse of network or application assets. The computer system further comprises a data collection layer that configures the system for holistic data collection. Additionally, an artificial intelligence machine learning layer, configures the system to dynamically learn, based on assessment and analysis of the collected data. Preferably, the assessment and analysis further comprises natural language processing in a natural language processing layer, a periodic surveying in a surveillance layer, a periodic reconnaissance in a reconnaissance layer, a periodic risk assessment in a risk assessment layer, a periodic change managing in a change management layer, a periodic reconfiguration in a configuration layer.

FIG. 1 depicts a system 100 for detecting security threats over a network and taking remedial action based on those detected security threats. The data collection layer 101 holistically collects data from a plurality of appliances and appliance layers. Collected data includes, but is not limited to, encrypted data, metadata, and data packets.

The assessment and analytical layer 102 assesses and analyzes risk based on pre-determined criteria and the collected data 101. This layer 102 is comprised of an artificial intelligence machine learning layer 103, natural language processing layer 104, reconnaissance layer 105, surveillance layer 106 and risk assessment layer 107. The assessment and analytical layer 102 further comprises cognitive cyber-security analytics in an artificial neural network. The automatic machine learning layer 103 recognizes threat patterns, vulnerabilities, anomalous behavior, and the malicious attack or misuse of network or application assets.

The remediation implementation layer 108 provides an appropriate automated response to the assessed and analyzed security risk component. This includes, but is not limited to, automatically isolating any misuse that has been identified with the identified security risk profiles and automatically implementing surveillance of the misuse in the isolated environment. The remediation implementation layer 108 is comprised of a change management layer 109 and a configuration layer 110.

Aspects of the present disclosure can be practiced with a variety of computer-system and computer-network configurations, including hand-held devices, multiprocessor systems, microprocessor-based or programmable-consumer electronics, minicomputers, mainframe computers, and the like. In addition, aspects of the present disclosure can be practiced in distributed-computing environments where tasks are performed by remote-processing devices that are linked through a communications network to a computer facility. Aspects of the present disclosure can therefore, be implemented in connection with various hardware, software or combinations thereof, in a computer system or other processing system.

Any of the methods described herein can include machine readable instructions for execution by: (a) a processor, (b) a controller, and/or (c) any other suitable processing device. Any algorithm, software, or method disclosed herein can be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it can be implemented by an application specific integrated circuit (ASIC), a programmable logic device (PLD), a field programmable logic device (FPLD), discrete logic, etc.).

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A computer implemented method comprising:
   aggregating data from a plurality of physical sensors coupled to a cooling system comprising a controller and connected to a computer automated system over a network, wherein aggregating data comprises collecting data over the network from a plurality of appliances and application layers;

based on the aggregated data, estimating an energy efficiency of the cooling system with reference to a plurality of pre-defined parameters;

based on the estimated energy efficiency with reference to the plurality of pre-defined parameters, initiating a single or plurality of calibrations to the cooling system via the controller such that the energy efficiency matches the plurality of pre-defined parameters, wherein the plurality of pre-defined parameters are based on an optimal energy efficiency range;

estimating based on the collected data and on pre-determined criteria, a single or plurality of remedial actions for the corresponding plurality of appliances, wherein the estimation of the single or plurality of remedial actions is derived from an artificial neural network implementation;

sending the estimated single or plurality of remedial actions to the corresponding plurality of application layers over the network;

based on a verification by the plurality of application layers against a plurality of pre-defined local parameters, triggering the estimated single or plurality of remedial actions to the corresponding appliances;

autonomically learning a behavior profile of the plurality of appliances via the corresponding plurality of application layers based on the triggered estimated single or plurality of remedial actions; and based on the learned behavior profile, predicting a future energy efficiency of the plurality of appliances.

2. The computer implemented method of claim 1 further comprising:
in estimating the energy efficiency of the cooling system, estimating an energy efficiency score based on pre-defined criteria.

3. The computer implemented method of claim 1 wherein the energy efficiency range is based on a pre-configured library, a periodic surveying, a periodic change managing, and a periodic reconfiguration.

4. The computer implemented method of claim 1 further comprising:
in estimating based on pre-determined criteria, one or more remedial actions from the collected data, at least one of evaluating, simulating and recognizing a usage pattern.

5. The computer implemented method of claim 1 wherein in autonomically learning a behavior profile of the plurality of appliances via the corresponding plurality of application layers based on the triggered remedial actions in the artificial neural network implementation, predictively recognizing remedial actions based on the learned behavior profile.

6. The computer implemented method of claim 1 further comprising:
collecting the data via a data collection layer;
assessing based on the collected data and learned behavior profile, via an artificial intelligence machine learning layer, an efficiency quotient of the cooling system; and
wherein the assessment further comprises natural language processing in a natural language processing layer, a periodic reconnaissance, and a periodic risk assessment.

7. The computer implemented method of claim 1 further comprising:
analyzing and identifying a usage requirement of an appliance or application in the cooling system; and
automatically lowering or raising an operation of the appliance or application based on the analyzed and identified usage requirement.

8. The computer implemented method of claim 1, further comprising:
analyzing and identifying a risk profile of an appliance or application based on an assessed risk level and one or more identified security risks;
automatically isolating any misuse that has been identified with the appliance or application and automatically implementing surveillance of the misuse in an isolated environment; and
analyzing the security and behavior profile data collected from the surveillance of the misuse in the isolated environment.

9. A computer automated system comprising a hardware processor coupled to a memory element having encoded instructions thereon, which encoded instructions implemented by the hardware processor cause the computer automated system to:
aggregate data from a plurality of physical sensors coupled to a cooling system comprising a controller and connected to the computer automated system over a network, wherein aggregating data comprises collecting data over the network from a plurality of appliances and application layers;
based on the aggregated data, estimate an energy efficiency of the cooling system with reference to a plurality of pre-defined parameters;
based on the estimated energy efficiency with reference to the plurality of pre-defined parameters, initiate a single or plurality of calibrations to the cooling system via the controller such that the energy efficiency matches the plurality of pre-defined parameters, wherein the plurality of pre-defined parameters are based on an optimal energy efficiency range;
in initiating the single or plurality of calibrations for the cooling system, estimate based on the collected data and on pre-determined criteria, a single or plurality of remedial actions for the corresponding plurality of appliances, wherein the estimation of the single or plurality of remedial actions is derived from an artificial neural network implementation; and
send the estimated single or plurality of remedial actions to the corresponding plurality of application layers over the network;
based on a verification by the plurality of application layers against a plurality of pre-defined local parameters, trigger the estimated single or plurality of remedial actions to the corresponding appliances;
autonomically learn a behavior profile of the plurality of appliances via the corresponding plurality of application layers based on the triggered estimated single or plurality of remedial actions; and
based on the learned behavior profile, predict a future energy efficiency of the plurality of appliances.

10. The computer automated system of claim 9 wherein the computer automated system is further caused to:
in estimating the energy efficiency for the cooling system, estimate an energy efficiency score based on pre-defined criteria.

11. The computer automated system of claim 9 wherein the energy efficiency range is based on a pre-configured library, a periodic surveying, a periodic change managing, and a periodic reconfiguration.

12. The computer automated system of claim 9 wherein the computer automated system is further caused to:

in estimating based on pre-determined criteria, one or more remedial actions from the collected data, at least one of evaluate, simulate and recognize a usage pattern.

13. The computer automated system of claim 9 wherein in autonomically learning a behavior profile of the plurality of appliances via the corresponding plurality of application layers based on the triggered remedial actions in the artificial neural network implementation, predictively recognizing remedial actions based on the learned behavior profile.

14. The computer automated system of claim 9 wherein the computer automated system is further caused to:
   collect the data via a data collection layer;
      assess based on the collected data and learned behavior profile, via an artificial intelligence machine learning layer, an efficiency quotient of the cooling system; and
   wherein the assessment further comprises natural language processing in a natural language processing layer, a periodic reconnaissance, and a periodic risk assessment.

15. The computer automated system of claim 9 wherein the computer automated system is further caused to:
   analyze and identify a usage requirement of an appliance or application in the cooling system; and
   automatically lower or raise a function of the appliance or application based on the analyzed and identified usage requirement.

16. The computer automated system of claim 9, wherein the computer automated system is further caused to: analyze and identify a risk profile of an appliance or application based on an assessed risk level and one or more identified security risks;
   automatically isolate any misuse that has been identified with the identified appliance or application and automatically implement surveillance of the misuse in an isolated environment; and
   analyze the security and behavior profile data collected from the surveillance in the isolated environment.

* * * * *